US008345645B2

(12) United States Patent
Kuc

(10) Patent No.: US 8,345,645 B2
(45) Date of Patent: Jan. 1, 2013

(54) WLAN ACCESS CONTROLLER PACKET BUFFERING

(75) Inventor: Zenon Kuc, San Jose, CA (US)

(73) Assignee: Avaya Inc., Basking Ridge, NJ (US)

(*) Notice: Subject to any disclaimer, the term of this patent is extended or adjusted under 35 U.S.C. 154(b) by 1657 days.

(21) Appl. No.: 11/262,609

(22) Filed: Oct. 31, 2005

(65) Prior Publication Data

US 2007/0097933 A1    May 3, 2007

(51) Int. Cl.
*H04W 4/00* (2009.01)
(52) U.S. Cl. .......................... 370/338; 725/89
(58) Field of Classification Search .................. 370/338, 370/328; 725/89, 94, 114
See application file for complete search history.

(56) References Cited

U.S. PATENT DOCUMENTS

| 5,159,592 | A | * | 10/1992 | Perkins | 370/338 |
| 2005/0138451 | A1 | * | 6/2005 | Simpson et al. | 713/320 |
| 2005/0259609 | A1 | * | 11/2005 | Hansquine et al. | 370/328 |
| 2006/0074970 | A1 | * | 4/2006 | Narayanan et al. | 707/102 |
| 2006/0277582 | A1 | * | 12/2006 | Kiiskinen et al. | 725/89 |
| 2007/0014259 | A1 | * | 1/2007 | Fajardo et al. | 370/331 |

* cited by examiner

*Primary Examiner* — Robert Wilson
*Assistant Examiner* — Wei Zhao
(74) *Attorney, Agent, or Firm* — Anderson Gorecki & Rouille LLP

(57) ABSTRACT

Traffic pending delivery to sleeping Mobile Units is buffered in an Access Controller. When a particular sleeping Mobile Unit wakes up, the Access Point with which the Mobile Unit is associated signals to the Mobile Unit indicating that traffic is buffered for that Mobile Unit. In response to signaling from the Mobile Unit via the Access Point, the Access Controller forwards the traffic buffered for that Mobile Unit. In particular, the traffic is transmitted from the Access Controller to the Access Point, and then from the Access Point to the Mobile Unit. A limit may be placed on the amount of time during which the Access Controller buffers traffic for a particular Mobile Unit.

16 Claims, 3 Drawing Sheets

WLAN ACCESS CONTROLLER PACKET BUFFERING

FIELD OF THE INVENTION

This invention relates generally to the field of network communications, and more particularly to Wireless Local Area Networks.

BACKGROUND OF THE INVENTION

Wireless Local Area Networks ("WLANs") initially became popular for providing network access to Mobile Units such as laptop computers and PDAs. Recently, WLANs have been used to provide telecommunications services, i.e., with cellular phones being the Mobile Units. Support for voice communications has altered the requirements of WLAN equipment.

Because mobile units are typically powered by rechargeable batteries, it is generally desirable to conserve power in order to achieve the greatest practical operating time from a battery charge. There is a particularly keen focus on power conservation in cell phone engineering, perhaps because cell phones are expected to operate for longer periods of time between battery charges in comparison with other types of Mobile Units. One technique for conserving battery power is sleep mode. Sleep mode is a technique in which non-essential Mobile Unit functions are temporarily halted, and non-essential Mobile Unit components are temporarily de-powered. A Mobile Unit typically signals to the associated Access Point prior to entering sleep mode in order to indicate the planned duration of the sleep mode. The sleep mode duration signaled by the Mobile Unit is known as a "Listen Interval," and it is measured in terms of a number of beacons. The Access Point must then buffer traffic bound for the Mobile Unit in sleep mode. In particular, the IEEE 802.11 standard mandates that the traffic be buffered for at least the Listen Interval. An aging function is employed by the Access Point to determine how long traffic has been buffered in order to prompt optional discard of traffic that is buffered beyond the Listen Interval. The extent to which traffic is buffered beyond the Listen Interval is generally at the discretion of the equipment designer. While the sleep mode technique facilitates Mobile Unit battery power savings, it is somewhat problematic because the memory required to buffer traffic in the Access Point increases the cost of the Access Point, and it is particularly desirable to reduce the cost of Access Points because they are logically disposed at the network edge and therefore deployed in relatively large numbers.

SUMMARY OF THE INVENTION

In accordance with the invention, apparatus for providing network access to mobile units via wireless access points, comprises: a port in communication with a network; a port in communication with the access points; a memory operable to buffer data units bound for ones of the mobile units in sleep mode, the memory being shared between a plurality of the wireless access points; and a switch operable to forward a first one of the buffered data units, which is bound for a first mobile unit, to the wireless access point with which the first mobile unit is associated.

In further accordance with the invention, a method for providing network access to mobile units via wireless access points, comprises the steps of: buffering, in a memory, data units bound for ones of the mobile units in sleep mode, the memory being shared between a plurality of the wireless access points; and forwarding, with a switch, a first one of the buffered data units, which is bound for a first mobile unit, to the wireless access point with which the first mobile unit is associated.

One advantage of the invention is that Mobile Units may be able to utilize longer duration sleep modes. In order to support longer sleep duration it is generally necessary to increase buffer capacity. While this could be accomplished by increasing buffer size in the Access Points alone, that would result in increased cost per Access Point. The invention mitigates the cost increase for increased buffer capacity by creating a more efficient shared buffer in the Access Controller, and by concentrating the increased capacity in a device, viz., the Access Controller, which is generally deployed in lesser numbers than Access Points. Further, even if longer duration sleep modes are not employed the invention facilitates reduction of cost of Access Points.

DETAILED DESCRIPTION

Figure 1:
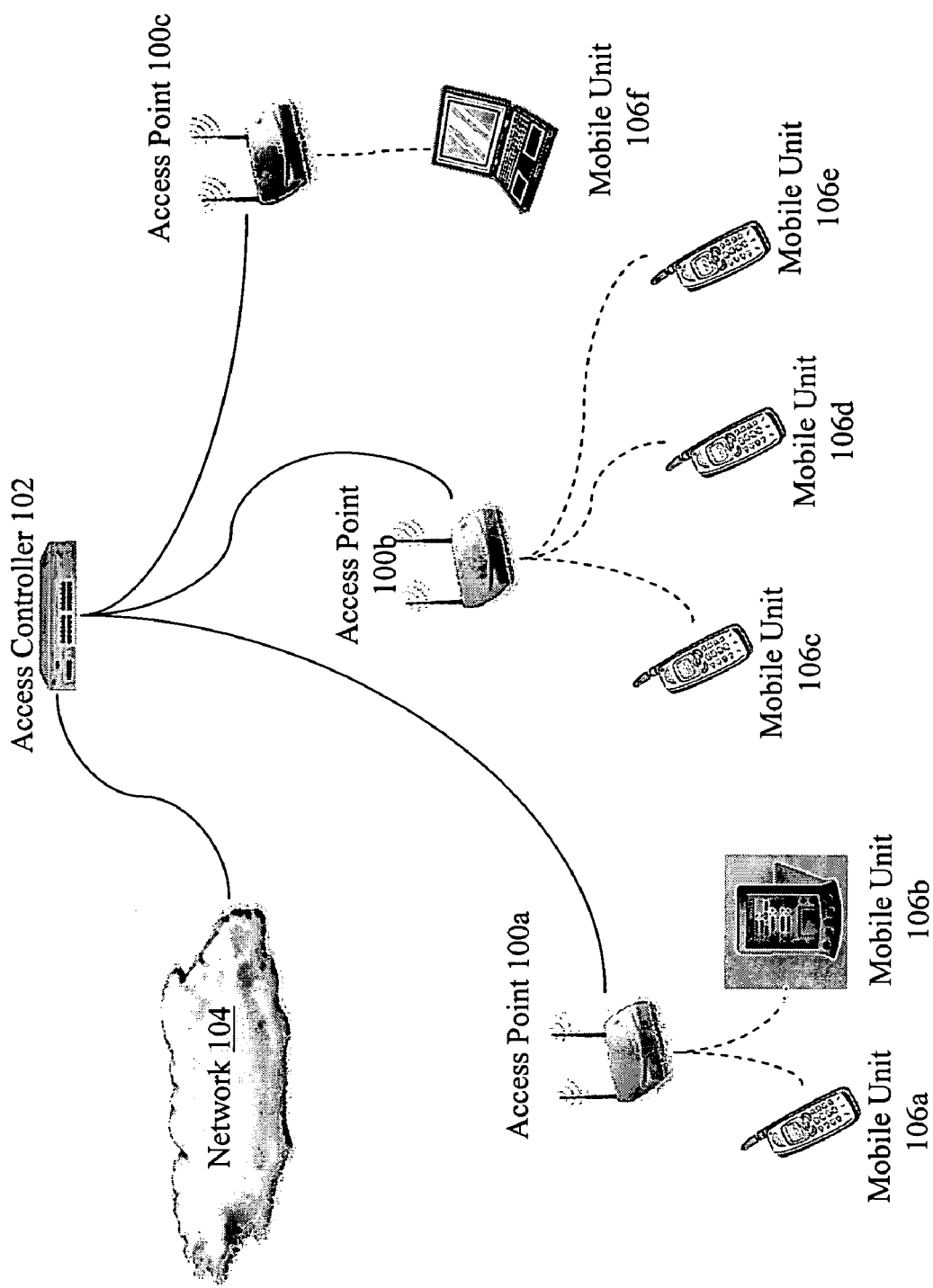
FIG. 1 is a block diagram of a WLAN in which an Access Controller buffers traffic for a Mobile Unit.

FIG. 1 illustrates a WLAN in which multiple wireless Access Points (100a-100c) are in communication with an Access Controller (102), and the Access Controller is in communication with a network (104) such as the Internet. The physical media used to connect the Access Points with the Access Controller, and the Access Controller with the network will typically be wireline, and may be either electrical or optical. The Access Points are operable to provide wireless network access to Mobile Units (106a-106f). In particular, a Mobile Unit associates with an Access Point, which shifts traffic between wireless and wireline domains. The Access Controller (102) provides a switching function by forwarding packets from the network to the appropriate Access Point so that those packets can be delivered to the appropriate Mobile Unit.

Figure 2:
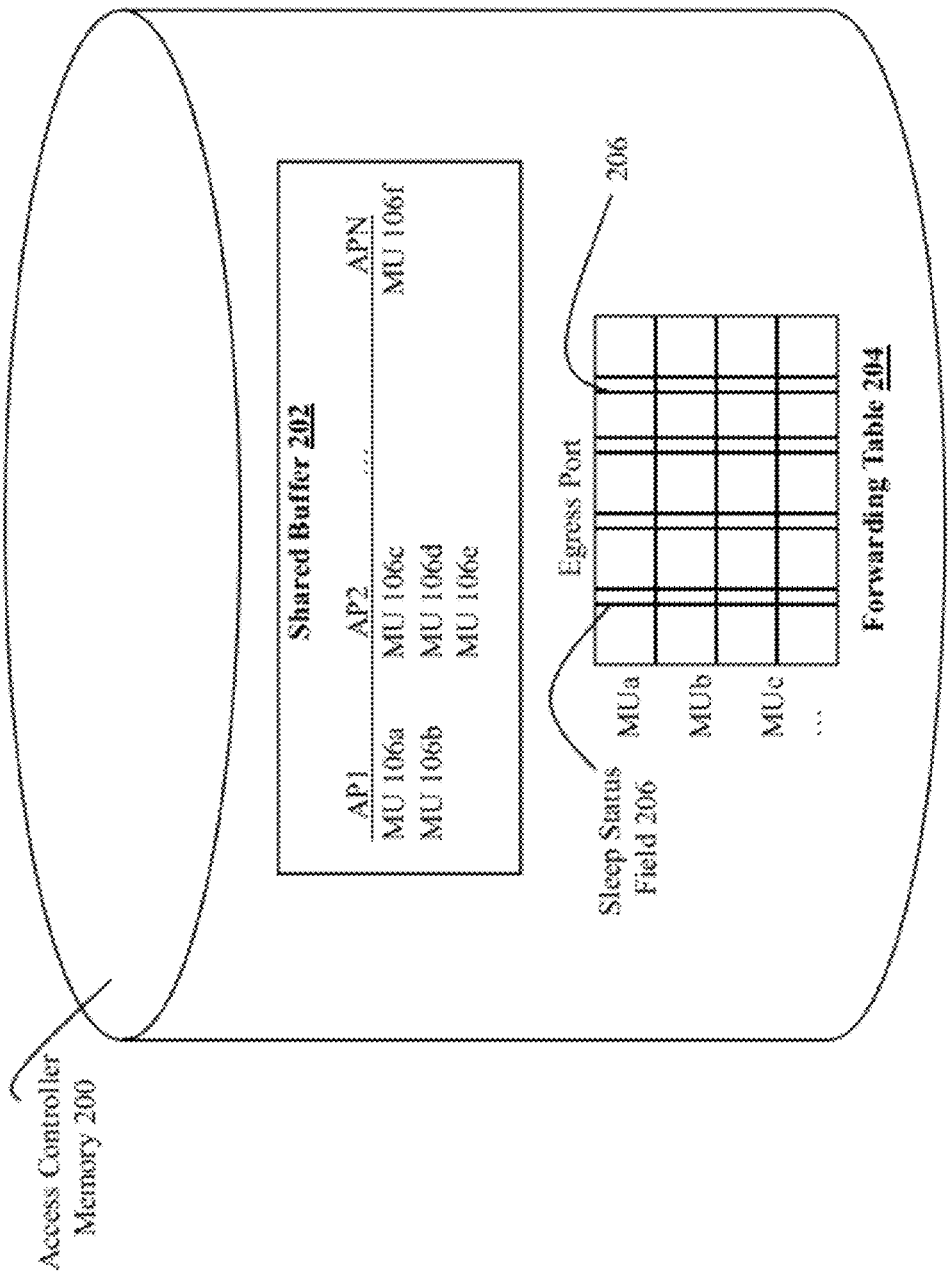
FIG. 2 illustrates the shared buffer and forwarding table of the Access Controller

Referring now to FIGS. 1 and 2, the Access Controller (102) has memory (200) which provides a shared buffer (202) for traffic bound for Mobile Units from the network. In particular, the shared buffer can be employed to temporarily store traffic bound for each Mobile Unit supported by each Access Point supported by the Access Controller. Because the shared buffer can be utilized by more Mobile Units than the buffer of any single Access Point, the shared buffer can be more efficiently utilized. Further, providing the shared buffer tends to mitigate the memory requirements for the Access Point, thereby permitting use of less costly Access Points with reduced memory.

The Access Controller memory (200) may also include a forwarding table (204). The forwarding table indicates an egress port (of the Access Controller) indexed by Mobile Unit (represented by the Mobile Unit MAC address). The forwarding table is utilized by the Access Controller to identify the appropriate egress port for traffic received from the network which is bound for one of the supported Mobile Units. Further, each entry in the forwarding table (204) may include a sleep status field (206) indicative of whether the Mobile unit is in sleep mode. The sleep status field enables selective buffering of traffic based on sleep status. The sleep status field may also indicate a duration of time for the sleep mode ("Buffer Interval").

Figure 3:
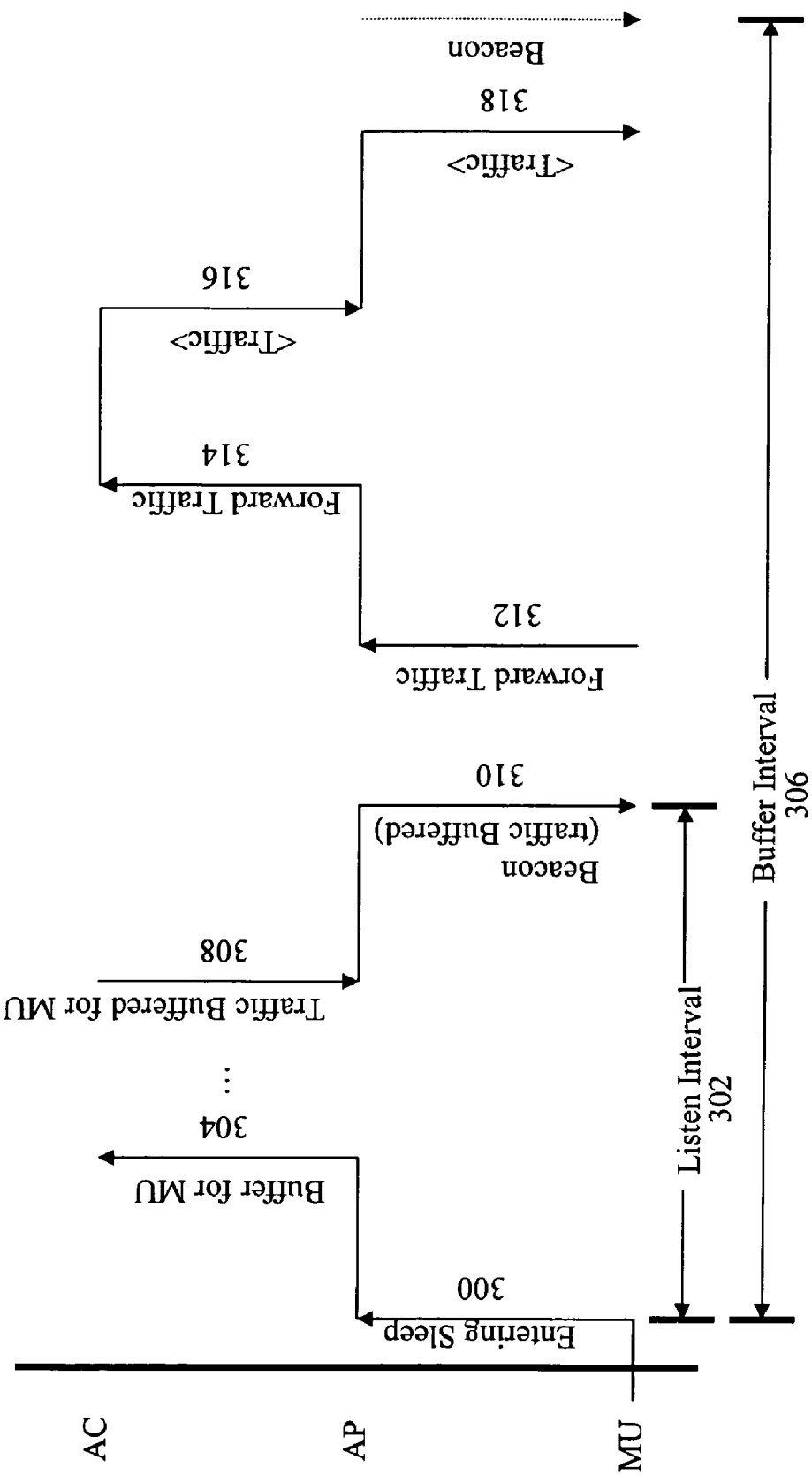
FIG. 3 is a timing diagram of signaling between the Mobile Unit, Access Point and Access Controller.

Referring now to FIGS. 1 through 3, in one embodiment of the invention the shared buffer (202) is utilized only for traffic bound for Mobile Units in sleep mode. In an initial step a Mobile Unit (106a) signals (300) to the Access Point (100a) with which it is associated that the Mobile Unit is entering sleep mode. The signal (300) may indicate a period (duration) of time for the sleep mode ("Listen Interval") (302), which is an integral number of beacon periods. The Access Point subsequently signals (304) to the Access Controller indicating that traffic bound for that Mobile Unit is to be buffered in the shared memory, and also indicating a Buffer Interval (306) calculated as a function of the Listen Interval (302), e.g., Listen Interval plus two beacons. In response to the signal (304) from the Access Point the Access Controller sets a sleep flag and Buffer Interval in the sleep mode field (206) of the entry in the forwarding table (204) corresponding to the Mobile Unit.

Further signaling is somewhat dependent upon whether traffic bound for the Mobile Unit (106a) is received by the Access Controller (102). If no traffic bound for the Mobile Unit is received within the Buffer Interval (306) then the Mobile Unit simply wakes and listens for a beacon signal from the Access Point, which will be indicative of the lack of traffic bound for the Mobile Unit. If traffic bound for the Mobile Unit is received by the Access Controller during the Buffer Interval then the Access Controller signals (308) to the Access Point to indicate that the traffic has been buffered. For example, the Access Controller may periodically generate Access Controller Traffic Indication Map ("ACTIM") packets, which the Access Point may combine with its locally generated Traffic Indication Map ("TIM") field. In response, the Access Point signals (310) to the Mobile Unit, as part of a beacon, to indicate that traffic is buffered for the Mobile Unit. No further action is taken until the Mobile Unit signals (312) to the Access Point to prompt delivery of the buffered traffic. In response to signaling from the Mobile Unit, the Access Point signals (314) to the Access Controller to prompt delivery of the traffic. In response to the signaling (314), the Access controller forwards (316) the traffic to the Access Point, which in turn forwards (318) the traffic to the Mobile Unit. Depending on protocol overhead and latency, the Access Point may forward one buffered packet from the Access Controller, retrieve all buffered packets from the Access Controller, or retrieve a fixed number of packets from the Access Controller. Some of the retrieved packets may be buffered by the Access Point pending delivery to the Mobile Unit. If the buffered traffic is not retrieved from the Access Controller within the Buffer Interval then the traffic may be either dropped or forwarded to the Access Point, depending on configuration.

In an alternative embodiment the Access Point preloads the buffered traffic in anticipation of delivery to the Mobile Unit. In particular, if the Access Controller signals during the Listen Interval that traffic is buffered for the Mobile Unit then the Access Point prompts the Access Controller to forward the buffered traffic to the Access Point prior to the end of the Listen Interval, i.e., before the Mobile Unit requests delivery of the buffered traffic. Further, if the Mobile Unit fails to prompt delivery by signaling to the Access Point then the Access Point may buffer the traffic and continue to indicate via beacons that the traffic is buffered for the Mobile Unit. The Access Point may also provide such an indication in an ACK message if the Mobile Unit generates traffic.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for providing network access to mobile units via wireless access points, the apparatus comprising:
    a first port in communication with a network;
    a second port in communication with the access points;
    a memory operable to buffer data units from the network bound for ones of the mobile units which are known to be in sleep mode, the memory being shared between a plurality of the wireless access points; and
    a switch, coupled to the first port and the second port and the memory, operable to forward a first one of the buffered data units, which is bound for a first mobile unit, to the wireless access point with which the first mobile unit is associated.

2. The apparatus of claim 1 further including a forwarding table including a separate sleep status field for each of a plurality of the mobile units.

3. The apparatus of claim 2 wherein each sleep status field includes a buffer interval indicative of a duration of time during which the data units are buffered for the mobile unit.

4. The apparatus of claim 3, wherein the wireless access point is operable to signal an indication of which mobile unit is entering sleep mode, and a duration of time of that sleep mode, further including control logic operable to calculate the buffer interval based at least in part on the duration of time of that sleep mode.

5. The apparatus of claim 4 further including control logic operable, if a data unit bound for the first mobile unit is buffered within the buffer interval, to signal to the access point with which the mobile unit is associated indicating that such data unit is buffered.

6. The apparatus of claim 1 wherein the switch is operable in response to signaling from the access point to forward selected buffered data units to the access point.

7. The apparatus of claim 3 wherein the data units not retrieved during the buffer interval are dropped.

8. The apparatus of claim 3 wherein the data units not retrieved during the buffer interval are forwarded to the appropriate access point.

9. A method for providing network access to mobile units via wireless access points, the method comprising:
    buffering, in a memory, data units bound for ones of the mobile units which are known to be in sleep mode, the memory being shared between a plurality of the wireless access points; and
    forwarding, with a switch, coupled to the memory, a first one of the buffered data units, which is bound for a first mobile unit, to the wireless access point with which the first mobile unit is associated.

10. The method of claim 9 further including the step of populating, in a forwarding table, a separate sleep status field for ones of the mobile units.

11. The method of claim 10 wherein each sleep status field includes a buffer interval indicative of a duration of time during which the data units are buffered for the mobile unit.

12. The method of claim 11, wherein the wireless access point is operable to signal an indication of which mobile unit is entering sleep mode, and a duration of time of that sleep mode, further including the step of calculating the buffer interval based at least in part on the duration of time of that sleep mode.

13. The method of claim 12 further including the step of, if a data unit bound for the first mobile unit is buffered within the buffer interval, signaling to the access point with which the mobile unit is associated indicating that such data unit is buffered.

14. The method of claim 9 including the further step of forwarding selected buffered data units to the access point in response to signaling from the access point.

15. The method of claim 11 including the further step of dropping the data units not retrieved during the buffer interval.

16. The method of claim 11 including the further step of forwarded, to the appropriate access point, data units not retrieved during the buffer interval.

* * * * *